US009250496B1

(12) United States Patent
Thaniyavarn

(10) Patent No.: US 9,250,496 B1
(45) Date of Patent: Feb. 2, 2016

(54) HIGH-RF FREQUENCY ANALOG FIBER-OPTIC LINKS USING OPTICAL SIGNAL PROCESSING TECHNIQUES

(71) Applicant: Suwat Thaniyavarn, Bellevue, WA (US)

(72) Inventor: Suwat Thaniyavarn, Bellevue, WA (US)

(73) Assignee: EOSpace Inc., Redmond, WA (US)

( * ) Notice: Subject to any disclaimer, the term of this patent is extended or adjusted under 35 U.S.C. 154(b) by 531 days.

(21) Appl. No.: 13/623,951

(22) Filed: Sep. 21, 2012

Related U.S. Application Data

(60) Provisional application No. 61/537,876, filed on Sep. 22, 2011.

(51) Int. Cl.
| | |
|---|---|
| *G02F 1/03* | (2006.01) |
| *H04B 10/25* | (2013.01) |
| *G02F 1/225* | (2006.01) |
| *H04B 10/2575* | (2013.01) |
| *G02F 1/035* | (2006.01) |

(52) U.S. Cl.
CPC ............ *G02F 1/2255* (2013.01); *G02F 1/0356* (2013.01); *H04B 10/2575* (2013.01)

(58) Field of Classification Search
None
See application file for complete search history.

(56) References Cited

U.S. PATENT DOCUMENTS

| | | | |
|---|---|---|---|
| 6,115,162 A | 9/2000 | Graves | |
| 6,643,417 B2 | 11/2003 | Strutz | |
| 6,842,569 B2 | 1/2005 | Thaniyavarn | |
| 6,996,345 B1 | 2/2006 | Chen | |
| 7,643,708 B2 | 1/2010 | Kawano | |
| 7,660,491 B2 | 2/2010 | Thaniyavarn | |
| 7,916,981 B2 | 3/2011 | Kawano | |
| 2003/0030868 A1 | 2/2003 | Sasai | |
| 2009/0034898 A1 | 2/2009 | Kawano | |

FOREIGN PATENT DOCUMENTS

| | | |
|---|---|---|
| JP | 2001-174766 | 6/2001 |
| JP | 2001-174766 | 7/2001 |
| JP | 2005-107225 | 4/2005 |
| JP | 2005-107229 | 4/2005 |

*Primary Examiner* — Jerry Rahll
(74) *Attorney, Agent, or Firm* — James Creighton Wray

(57) ABSTRACT

Wide band phase modulators used with high power laser carriers convert high-frequency RF signals to phase-modulated optical signals. Higher laser optical power to the modulator produces larger RF signal sidebands. A carrier attenuation filter passes the attenuated carrier and non-attenuated RF modulation sidebands. Carrier attenuation leaves the larger RF signal sidebands. A demodulation filter used with a photodetector or a balanced photodetector pair converts the phase-modulated optical signal back to an electrical signal. Carrier-only attenuation allows high power laser use, avoids photodetector damage or saturation, and provides increased RF link gain, low noise figure (NF) and high spurious-free dynamic range (SFDR). Filtered-out carrier power fed back to the laser source increases to overall system efficiency. An additional optical delay filter with dual outputs used with a polarization multiplexer or a coherent combiner coupler combines signal power to a single photodetector to further increase electro-optic signal conversion efficiency.

34 Claims, 11 Drawing Sheets

HIGH-RF FREQUENCY ANALOG FIBER-OPTIC LINKS USING OPTICAL SIGNAL PROCESSING TECHNIQUES

This application claims the benefit of U.S. Provisional Application No. 61/537,876, filed Sep. 22, 2011, which is hereby incorporated by reference in its entirety as if fully set forth herein.

This invention was made with Government support under DARPA Contract No. W31P4Q-10-C-0210 awarded by the Department of Defense. The Government has certain rights in this invention.

BACKGROUND OF THE INVENTION

Current analog fiber-optic links using intensity modulators are used in both defense, aerospace and commercial applications for transmission of analog radio frequency (RF) signals from antennas. The current fiber-optic links have limited performance, particularly at high RF frequencies (10 to >100 GHz) due to limitations of modulators declining conversion efficiency at higher RF frequencies, and small-area high frequency photodetector with limited optical power handling before non-linear saturation and damage occur. These limitations posed by the modulators and photodetectors severely limit the performance and implementation viability of the conventional RF fiber optic links for these high-RF frequency signal transmission.

This invention is an extension of the invention by the same inventor, described in U.S. Pat. No. 7,660,491, by Suwat Thaniyavarn, issued to EOSpace Inc. on Feb. 9, 2010).

Current analog RF fiber-optic links for higher RF frequency signals have problems to be solved. There are currently no viable RF coax or waveguide transmission lines for transmitting RF signals with extremely high frequencies (10 to >100 GHz) from an antenna, due to high loss, weight and limited bandwidth. Instead, these high frequency RF signals are processed or down-converted near the antenna, resulting in significant loss of fidelity and limited-bandwidth of channelizing techniques.

An analog RF fiber-optic link offers potential for enormous bandwidth, transmission-length independent loss and wideband RF-photonic signal processing. However, current fiber-optic link performance must be significantly improved, particularly for very-high mm-wave frequencies. These problems are due to the fact that although optical modulators (used for converting RF electrical signals into optical signals for signal transmission via optical fibers) and photodetectors (used to convert the transmitted optical signals via optical fibers back to RF signals at the receivers) can be made to operate at extremely high RF frequencies, they are less efficient at higher RF frequencies. In addition, photodetectors capable of very high RF frequency operation are typically very small in size, which is necessary for higher frequency operation, and therefore are only capable of very limited optical power handling. This limited optical power handling issue with high frequency photodetectors means higher-optical power source cannot be used. Limiting optical power at the photodetector means limited RF fiber-optic link performance in terms of poor link loss, high noise figure and lower dynamic range. These issues limit the current implementation of fiber-optic transmission of RF signals at very high RF (20->100 GHz) frequencies.

SUMMARY OF THE INVENTION

The invention provides improved analog RF Fiber-optic link implementations.

This invention describes techniques to achieve a high-RF-frequency fiber-optic link with simultaneous and dramatic performance improvement, including RF gain, low noise figure (NF) and high spurious free dynamic range (SFDR), by solving the optical component limitations stated in the background.

Such fiber-optic link implementations described in this invention can significantly alter the current high frequency RF signal distribution system architecture itself, without having to down-convert the RF signals at the antenna site.

This invention offers a viable solution for high performance fiber-optic transmission of high frequency RF signal for the first time.

The basic implementation of these RF Fiber-optic links includes an optical laser source, optical modulator, photodetector, and a combination of optical filters.

A cw-laser with low-RIN noise, high-power, high-coherent, narrow-line width is used as the optical power source. The photodetector should be capable of high RF frequency operation. The wideband optical modulator is a phase modulator (such as those based on broadband electro-optic travel-wave $LiNbO_3$ waveguide modulators).

Optical power from the laser source is transmitted to the modulator. Electrical (high frequency RF) signal is fed to the phase modulator and is converted into phase-modulated optical signal and transmitted via optical fiber to the photodetector through a set of optical filters.

The set of optical filters includes a combination of optical filters whose transfer function can be reconfigured to perform specific optical signal processing functions on the modulated optical signal before the optical signal is converted back to electrical signal at the photodetector.

One of the optical filter implementations is the reconfigurable optical delay-line interferometric type filters.

One key to this invention is the implementation of the combination of these reconfigurable optical filters, used to modify the optical frequency profile of the phase-modulated signal, resulting in a simultaneous and large increase in wideband RF link gain, noise figure and SFDR. The basic filter system (FIG. 1) has two reconfigurable optical filters connected in series. The first filter (A) is reconfigured to mainly attenuate only the optical power of the carrier by a certain amount, and with minimum effect on the modulation sideband signals.

After the optical signal has been through carrier-only attenuation process to reduce the DC power, a second dual-output optical delay-line filter (Filter B in FIG. 1) is used to "demodulate" the carrier-only attenuated phase-modulated signal, converting it back to an intensity modulated RF signal at the photodetector.

By using a higher optical power source, a much higher overall link gain can be achieved. However, higher power source cannot generally be used without damaging or saturating the small area, high frequency photodetector. This optical "carrier-only" attenuation technique allows the use of a higher power laser source without saturating/damaging the photodetector, by only attenuating the "DC" power component, namely the carrier to the level that is safe for the photodetector. Since the optical power at the photodetector is dominated by the carrier signal due to a typical small RF modulation depth, it is the carrier power that can saturate or damage the photodetector. By using a higher power source, the modulating signal sidebands are also higher, but without being attenuated, resulting in a much larger link gain at the photodetector.

For example, by increasing the optical power level by +10 dB using a higher power source, both the carrier and modulation sideband signals will increase by +10 dB. Once this optical signal is put through a −10 dB "carrier-only attenuation" filter, the photodetector will see the same optical carrier as before, when a lower power laser source was used. However, the power levels of the modulation sideband signals, not being attenuated, are increased by 10 dB. This leads to a 10 dB increase in the overall link gain. This new fiber-optic link using higher-power laser source and a carrier-only filter has a 10 times link gain as compared to a conventional fiber-optic link using a lower laser power using the same photodetector with optical power handling limitation, since the optical power received at the photodetector remain essentially the same for both cases. Effectively, this is equivalent to boosting the modulation voltage efficiency by a factor of square-root 10, using a lower optical power source.

This is an extension of a recent U.S. Pat. No. 7,660,491, by Suwat Thaniyavarn, the same inventor, issued Feb. 9, 2010 to EOSpace Inc.

This invention disclosed herein describes more advanced implementations and improvements over the previous U.S. Pat. No. 7,660,491 by using optical signal processing concepts and a combination of the optical filters with suitable transfer functions and optical delay-lines. The new analog RF fiber optic link implementations are particularly useful and most suitable for extremely-high RF (10 to >100 GHz) frequency signal transmission, with much higher performance level than conventional approaches, by solving the key fundamental issues that limit the performance of analog fiber-optic links for these high RF frequency signal transmission.

Current conventional fiber-optic links are not effective for very high RF frequencies due to fundamental issues with the two key optical components, namely the lower modulation efficiency of the optical modulators at these higher frequencies and the low optical power handling of the photodetectors with smaller-active detector areas, necessary to achieve large bandwidth for higher frequency operation.

This invention describes techniques using optical filters and optical signal processing concepts to solve these fundamental optical component limitation issues, resulting in analog fiber-optic links with extremely high performance level, including high link gain, low noise figure and high spur-free dynamic range at the same time for these extremely high RF frequency signal transmission.

The invention utilizes an optical modulator and multiple-staged optical filters with high-power laser source. The simplest form of optical filters for these applications can be formed using optical delay-line type filters, which can be made using low-loss optical fiber, and/or optical waveguide circuits on transparent material such as silica, polymer or electro-optic material such as Lithium Niobate substrates. Incorporation of voltage-tunable optical waveguide elements on electro-optic substrates allows flexibility in achieving voltage-tunable reconfigurable optical filter, which enhances the flexibility of this invention. Both Intensity and Phase modulators are applicable. However, a Phase modulator is the preferred type of modulator for these implementations.

Analog Fiber optic links a phase modulator, a high power laser, high frequency photodetector and a combination of optical filters. The first filter is set to perform carrier-only attenuation of the phase modulator optical frequency spectrum (without affecting the modulation sidebands) in the optical frequency domain, followed by an optical filter used to demodulate the carrier-attenuated phase-modulated signal into intensity modulated signal at the photodetector.

Reconfigurable dual-staged optical delay-line filter, fabricated on low-loss electro-optic substrate such as $LiNbO_3$ perform the filter functions.

The basic proposed fiber-optic link shown schematically in FIG. 1 uses high-power laser source and a carrier-only optical filter, a phase modulator, another optical filter for phase demodulation and a photodetector. In this basic link, optical power from the laser is filtered-out and discarded.

Another implementation shown schematically in FIGS. 6 and 7 reuses the filtered-out optical power. Instead of wasting the optical carrier power that is filtered out, the filtered-out carrier power is fed back to the laser, forming a new laser cavity configuration with the laser element, phase modulator and optical filter inside the new laser cavity. This new implementation eliminates wasting optical power and increases the overall "wall-plug" power consumption savings and efficiency of the system.

Another implementation shown schematically in FIG. 8 is suitable to achieve an even higher RF signal gain in a narrowband frequency range, by using an additional optical delay-line with an appropriate length and a polarization multiplexer to combine the two complementary signals from the two outputs into one photodetector. With a dual-output filter, complementary outputs are available. Oftentimes a single fiber and a single photodetector rather than dual fibers and balanced detector pair are preferred for transmitting of the RF modulated optical signal. By adding a proper time delay to one of the outputs and with a proper polarization rotated, as shown in FIG. 8, of this delayed optical signal, the two optical signals from the two output ports with orthogonal polarization can be combined with a polarization multiplexer and sent to the photodetector. The two polarization light signals are converted to RF signals independently at the photodetector. With a proper setting of the differential delay, for example 10 ps for RF signals centered at 50 GHz, so that the previously complementary (out-of-phase) RF signals from the two ports are now in-phase at the photodetector, essentially doubling the RF output of the photodetector. This implementation is useful to enhance RF link gain by synchronizing the RF phases of the two signals at the photodetector in a narrow bandwidth range with a single fiber and a single photodetector.

Another alternate implementation shown schematically in FIG. 9 is suitable to achieve a higher RF signal gain in a narrowband frequency range, by using an additional optical delay-line with an appropriate length and a coherent combiner to combine the two complementary signals from the two outputs into one photodetector. With an appropriate time delay and optical phase adjustment, the two optical signals are combined coherently (both optical and RF phases) into one photodetector.

The same implementations to achieve a higher RF signal gain in narrow frequency band by using an additional optical delay-line and optical multiplexers (polarization multiplexers shown in FIG. 10 and coherent combiners shown in FIG. 11) can be achieved with dual-complementary output intensity modulator based links.

A wide band phase modulator is used with a high power laser carrier to convert a high-frequency RF signal to a phase-modulated optical signal. Higher optical power from the laser to the modulator produces larger RF signal sidebands from a given RF input. A carrier attenuation filter attenuates the carrier and passes the attenuated carrier and non-attenuated RF modulation sidebands. Carrier attenuation leaves the larger RF signal sidebands. A demodulation filter is used with a photodetector or a balanced photodetector pair to convert the phase-modulated optical signal back to an electrical signal. Carrier-only attenuation allows high power laser use, avoids photodetector damage or saturation, and provides increased RF link gain, low noise figure (NF) and high spurious-free dynamic range (SFDR). Filtered-out carrier power can be fed back to the laser source to increase to overall system efficiency. An additional optical delay filter with dual outputs used with a polarization multiplexer or a coherent combiner coupler combines signal power to a single photodetector to further increase electro-optic signal conversion efficiency.

These and further and other objects and features of the invention are apparent in the disclosure, which includes the above and ongoing written specification, with the claims and the drawings.

DETAILED DESCRIPTION OF THE DRAWINGS

Figure 1:
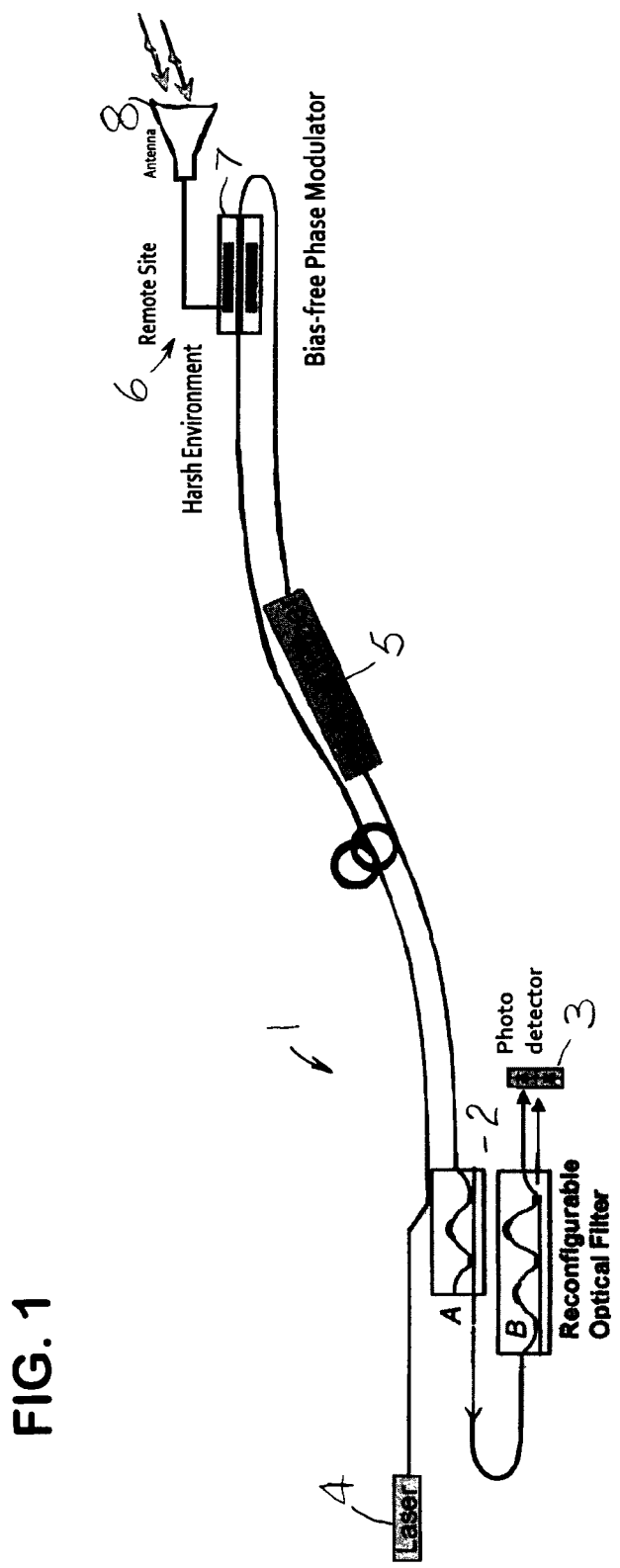
FIG. 1 shows a system which transmits laser carrier frequency to a remote site and the bias-free phase modulator at the antenna remote site modulates the laser carrier frequency with RF signal from the antenna, and returns the modulated signal through a carrier attenuation filter and a demodulation filter to photodetectors.

As shown in FIG. 1, a basic filter system 1 has two reconfigurable optical filters 2 connected in series. The first filter A is reconfigured to mainly attenuate only the optical power of the carrier by a certain amount, and minimum effect on the modulation sideband signals. The first filter's optical frequency transmission spectrum is set to be symmetric around the optical carrier in the optical frequency domain. For minimum attenuation of the modulating signal, the period of the delay-line filter should be set for maximum transmission of the modulation sideband frequencies. In general, a variety of other optical filters can be used for this task, including narrowband Fabry-Perot, fiber grating and etc. that attenuate only the carrier signal power.

The second filter B is used to demodulate the phase modulated signal and to provide results to balanced photodetectors 3. High power laser source 4 provides laser carrier power over the first of optical fibers 5 to a remote site to where a bias free phase modulator 7 uses RF signals from antenna 8 to phase modulate the laser carrier. The modulated signal is returned over the second optical fiber to the carrier attenuation filter A. The result is a link gain low noise figure and high spurious free dynamic range.

Figure 2:
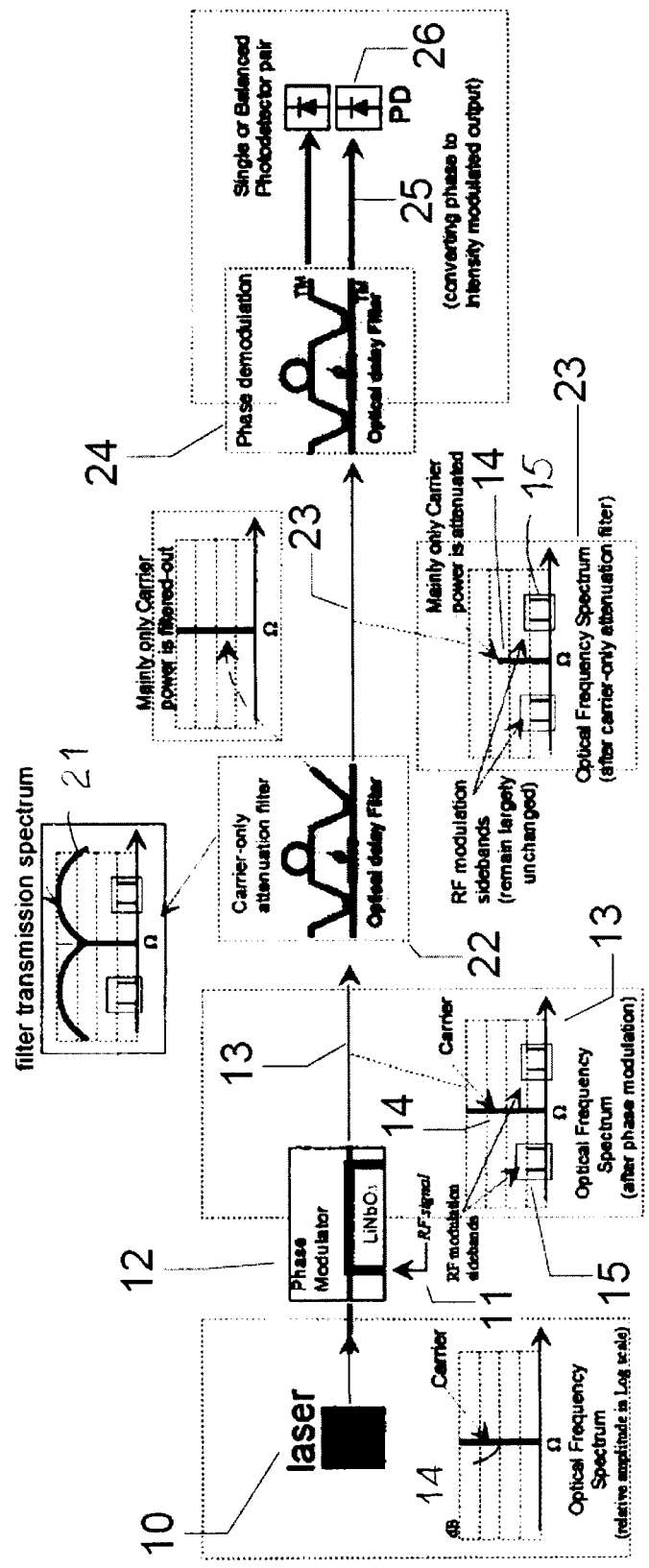
FIG. 2 schematically shows basic operations of the fiber-optic links with optical frequency spectrums at various stages.

FIG. 2 schematically shows basic operations of the fiber-optic links with optical frequency spectrums at various stages.

Carrier-attenuation techniques have not been used previously for phase-modulated links. In order to realize a useful the carrier-attenuated phase modulated link, an addition optical filter has to be included.

After an optical signal has been through a carrier-only attenuation process to reduce the DC power down so that it will not saturate or damage a photodetector, a second dual-output optical delay-line filter is used to demodulate the carrier-only attenuated phase-modulated signal, converting it back to an intensity modulated RF signal at the photodetector.

The overall basic operation of this link, including the key optical frequency spectrums, is illustrated schematically in the FIG. 2. Relative amplitude of frequencies is shown in log scale.

At the output of the high-power laser source 10, the optical frequency spectrum shows only a single optical carrier frequency spectrum $\Omega$ 14.

After the optical signal has passed through the $LiNbO_3$ phase modulator 12 in which an RF signal 11 is applied, the optical frequency spectrum 13 of a phase modulated optical signal shows the carrier signal 14 as well as the RF-modulation sidebands 15. Generally, the modulation sideband power levels are small as compared to the carrier power level. This is to maintain modulator's linearity, and also is due to poorer modulation efficiency at high RF frequencies.

This phase-modulated optical signal 13 is then passed through the first "carrier-only attenuation" reconfigurable filter 22, whose frequency transmission spectrum 21 is configured to be symmetrically around the carrier frequency, as seen in the illustration, which attenuates the carrier 14 by a certain amount (for example, at 10-20 dB range), while providing full transmission for the RF modulation sideband signals 15. Mainly only the carrier frequency 14 is filtered out. Thus, the modulation sidebands in signal 23 remain largely unaffected.

The amount of carrier-only attenuation level should be set so that the overall optical power ultimately received by the photodetector 26 at the end of the line is limited to below the level that damages, saturates or degrades the linearity and performance of the photodetector.

The optical frequency spectrum 23 after the carrier-only attenuation filter is shown with much less carrier signal 14. Thus, the ratio of the modulating sidebands 15 to the carrier increases as compared to using a lower power laser source without a carrier-only attenuation filter.

This carrier-attenuated optical signal 23 is sent to the second optical filter 24, whose frequency transmission spectrum is set asymmetrically around the carrier frequency to convert the optical phase modulation signal 25 to intensity modulation single or balanced photodetector pair at the photodetector 26.

U.S. Pat. No. 7,660,491, HIGH-DYNAMIC-RANGE ANALOG FIBER-OPTIC LINK USING PHASE MODULATION AND TUNABLE OPTICAL FILTER, Suwat Thaniyavarn, EOSPACE Inc. issued Feb. 9, 2010 is incorporated herein by reference as if fully set forth herein.

Using an optical delay-line filter 24 with dual-complementary outputs 25, both output signals can be sent to a balanced photodetector pair 26 for RIN noise cancellation and increase in signal gain.

Figure 3:
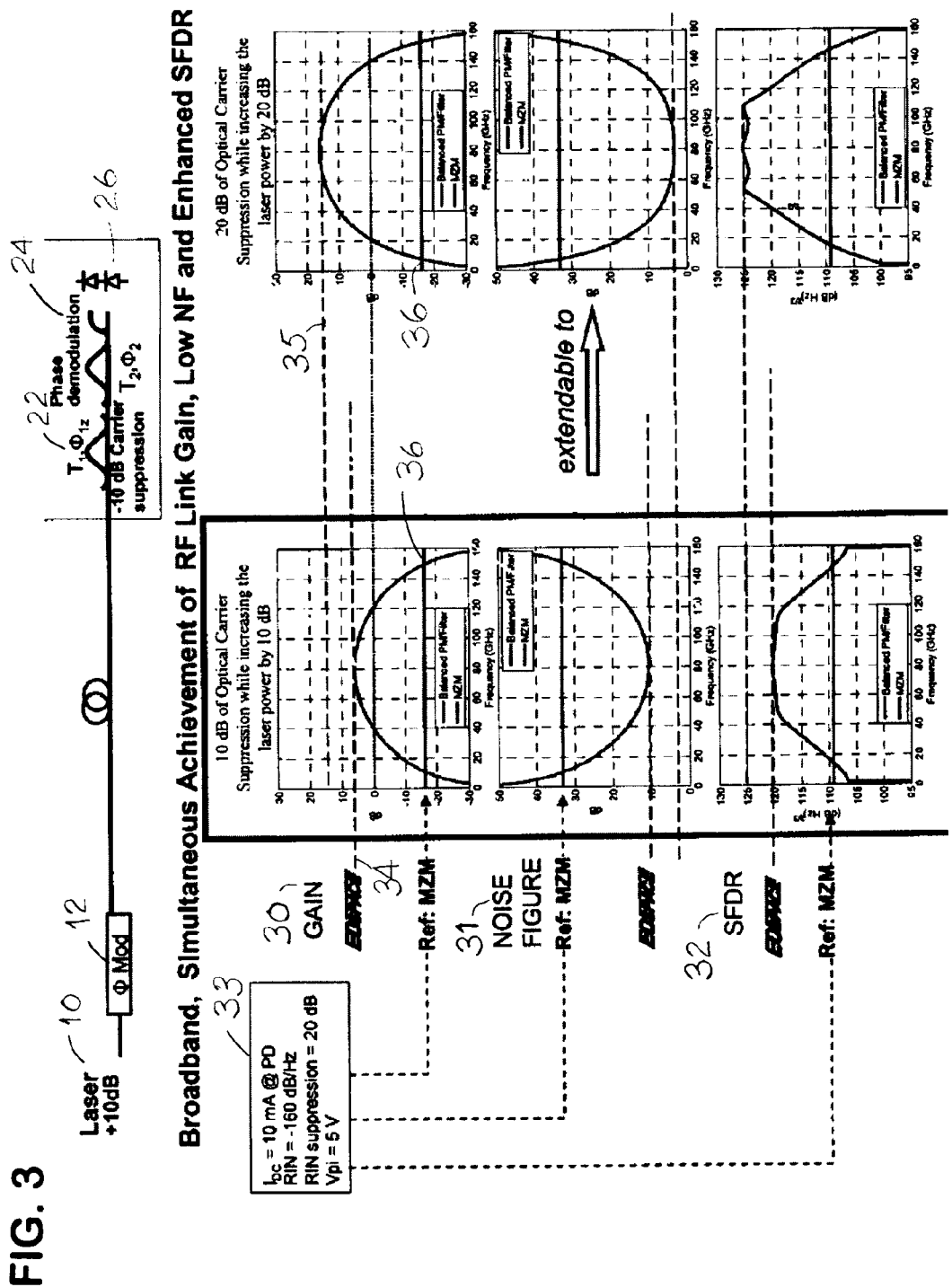
FIG. 3 shows calculated link gain, low noise figure (NF) and high spurious free dynamic range (SFDR).

FIG. 3 shows the broadband simultaneous achievement of RF link gain, low noise figure (NF) and enhanced spurious free dynamic range (SFDR).

The signal gain 30 is calculated as an RF link gain of this type of analog fiber-optic link.

As an example, a calculated RF link gain, noise figure (NF) 31 and spurious free dynamic range (SFDR) 32 of the new fiber-optic link using a phase modulator 12, a higher power laser source 10 and combination of carrier-only attenuation filter 22 and phase-demodulation filter 26 is discussed below.

With a modest current level at the photodetector 26 (10 mA), and a 5V-V$\pi$ modulator, a laser source 33 with −160 dB/Hz RIN noise and a balanced photodetector (RIN-noise suppression) is shown in FIG. 3, as a function of high RF frequency from dc-160 GHz.

The combined carrier-filtered phase modulation approach allows unprecedented RF link gain improvements of ~20-30 dB 34, 35 as compared to current conventional MZM 26 (Mach-Zehnder intensity modulation based) fiber-optic links at extremely high RF frequencies 37.

Even with these modest devices' parameters and simple delay-line filter, a link gain ~6-15 dB, with a low NF ~5-10 dB and a SFDR ~120-125 dB/Hz$^{2/3}$ at the band center is accomplished. The calculated filtered phase modulated F/O link with a 10->20 dB carrier filter is directly compared with a conventional MZM Intensity modulated link as a function of RF frequencies.

Figure 4:
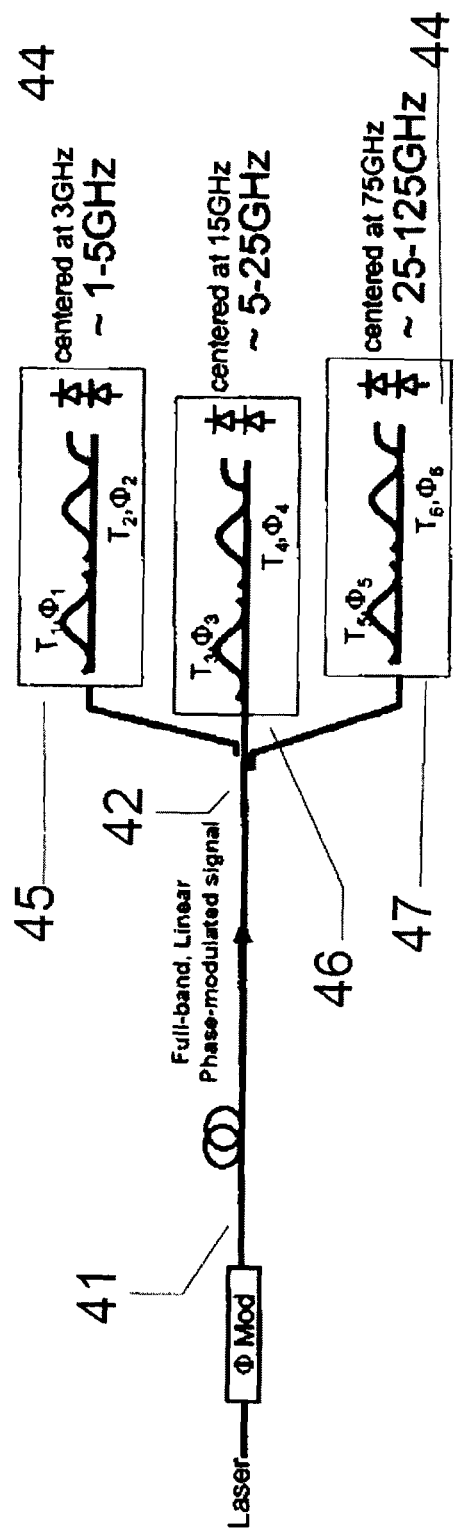
FIG. 4 shows links using parallel sets of filters and receivers for broader bandwidth coverage.

FIG. 4 shows links using parallel sets of filters and receivers for broader bandwidth coverage.

This proposed carrier-filtered phase-modulated fiber-optic link is broadband (multi-octave), with no second order intermod distortion. This optical technique is scalable to any RF frequency by simply changing the period of the delay-line filter. The higher the RF frequency, the more compact and lower-loss is the reconfigurable optical filter component.

Furthermore, to increase the bandwidth operation, the phase-modulated optical signal 41 can be split into multiple parallel receivers 46 simultaneously, with optical filters 45, 46, 47 with band-center set for 25-125 GHz, 5-25 GHz, and 1-5 GHz as shown in FIG. 4. Higher performance can be achieved simultaneously in all three bands, with the use of 3-times higher laser power.

Figure 5:
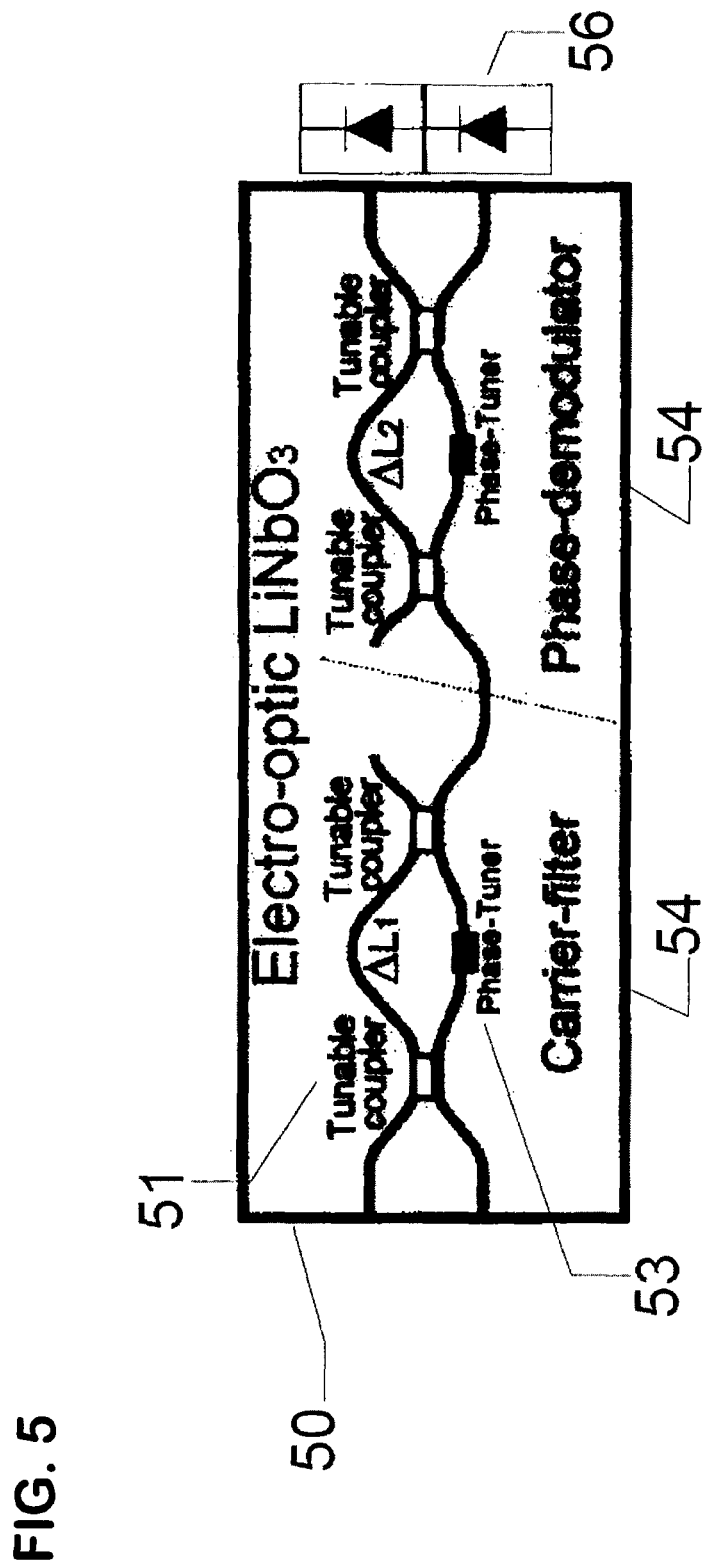
FIG. 5 shows high-speed reconfigurable optical filter; fabricated on electro-optic substrate such as $LiNbO_3$ for extremely high (10->100 GHz) RF frequency.

FIG. 5 shows high-speed reconfigurable optical filter fabricated on an electro-optic substrate such as LiNbO$_3$ for extremely high (10->100 GHz) RF frequency.

High-speed integrated, combined reconfigurable filter device implementation is provided. High-speed, reconfigurable optical filters 50 based on LiNbO$_3$ waveguide delay-line circuits can be used for optical signal processing at extremely-high RF frequencies without the need for high-speed electronics. Thus, this filter component is actually more compact and lower loss for higher RF frequencies, and thus is scalable to >100 GHz operation.

Incorporation of electro-optically tunable optical coupler 51 and phase tuner 53 elements, as illustrated in FIG. 5, allows high-speed reconfigurability of the optical frequency transmission spectrum of the filter 54. At high RF frequency applications, the required differential optical delay lines are very short for this type of filter, making it viable to make compact, low-loss integrated multiple stage filters 54 as shown in FIG. 5.

Figure 6:
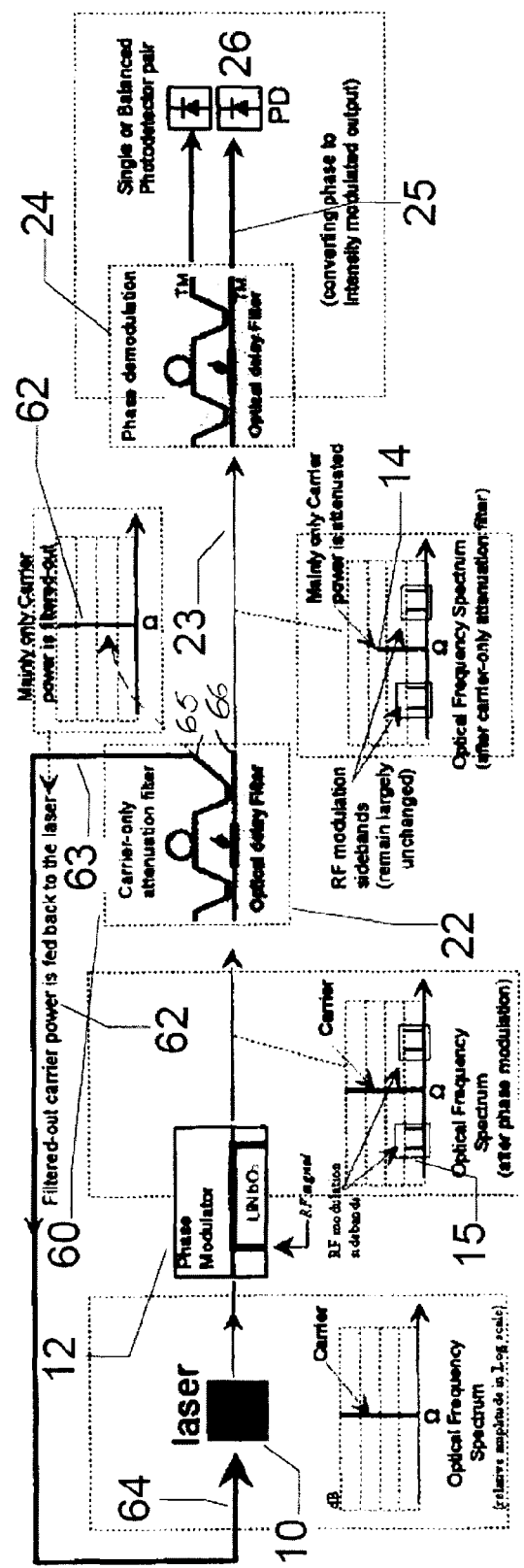
FIG. 6 schematically shows using a dual-output optical delay-line filter; the filtered-out carrier power is fed back to the laser in form of a new laser cavity.

FIG. 6 schematically shows using a dual-output optical delay-line filter. The filtered-out carrier power is fed back to the laser in form of a new laser cavity.

In addition to the basic implementation of the above fiber-optic links, these are some of the addition implementations for improvement.

Instead of wasting the optical carrier power that is filtered out, the invention can feed back this carrier power 62 back 64 to the laser source 10 as shown schematically in the FIG. 5 using an optical delay-line filter 22 with dual-output ports 65, 66.

The filtered-out carrier power 62 that exits from one of the output ports 65 of optical delay carrier-only attenuation filter 22 can be fed back 63 to the laser—forming a new laser cavity configuration with the laser element, phase modulator and optical filter inside 22 the new laser cavity 10. This development can eliminate wasting optical power and increase the overall "wall-plug" efficiency of the system.

Figure 7:
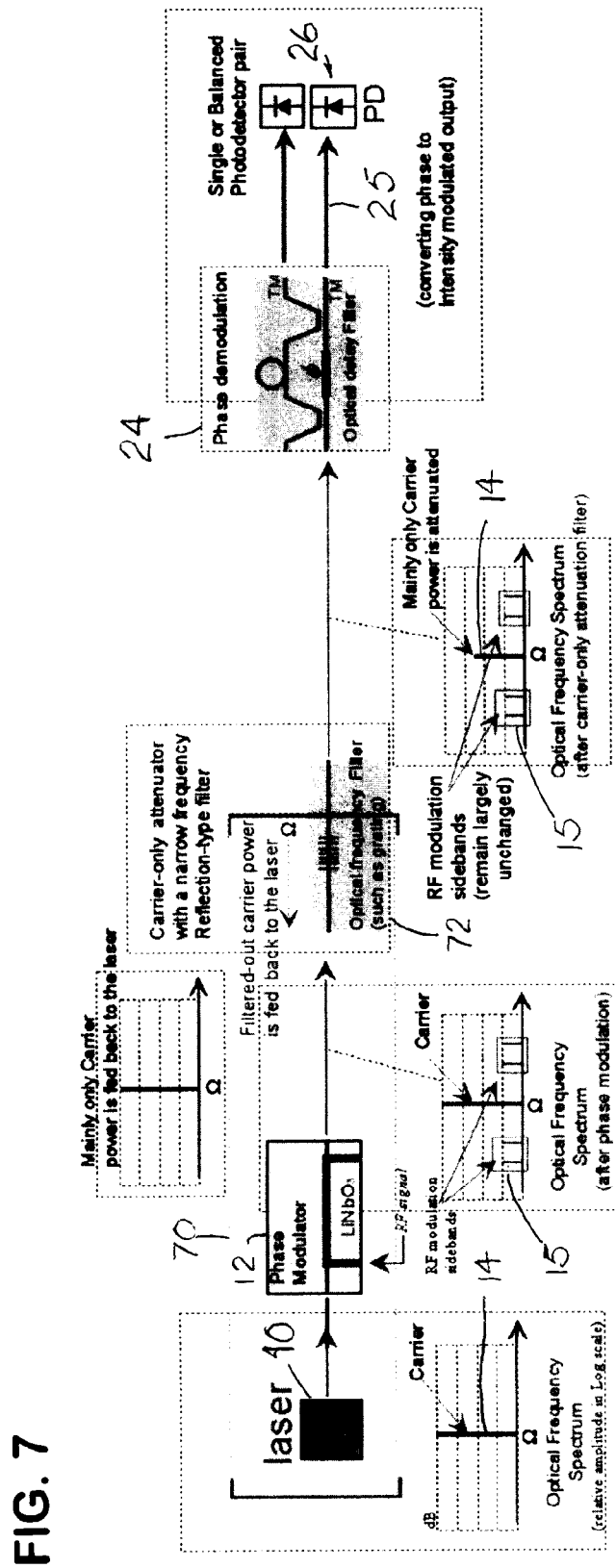
FIG. 7 schematically shows and example using a narrow-line reflection-type optical filter (such as optical grating), wherein the unneeded excess optical carrier power is fed back to the laser, forming of a new laser cavity.

FIG. 7 schematically shows using a narrowline reflection-type optical filter, such as optical grating. The unneeded excess optical carrier power is fed back to the laser, forming of a new laser cavity.

Instead of wasting the optical carrier power that is filtered out, the invention can feed back this carrier power back to the laser source 10 as shown schematically in the FIG. 7 using a carrier-only reflection type filter such as an optical grating filter 72. The optical feedback to the laser means a new laser cavity configuration with the laser element 10, phase modulator 12 and optical filter 72 inside the new laser cavity 70.

Figure 8:
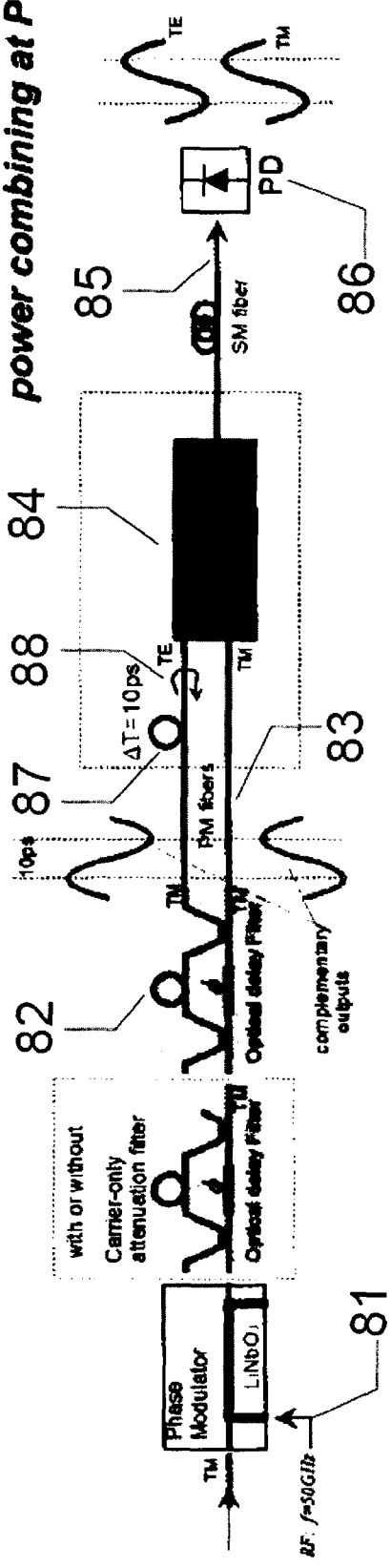
FIG. 8 schematically shows an example with additional optical delay-lines and a polarization multiplexer used to increase link gain of a phase modulator with a dual complementary-output filter using single output fiber and a single photodetector.

FIG. 8 schematically shows an additional optical delay-line and polarization multiplexer used to increase link gain, using single output fiber and a single photodetector.

For fiber-optic transmission of a narrowband RF signal 81, an additional optical delay-line 82 with proper delay time and a polarization multiplexer 84 can be used to further enhance the link gain, as shown schematically in FIG. 8.

With a dual-output filter 82, complementary outputs 83 are available, as shown. Often, a single fiber and a single photodetector 86, rather than dual fibers and balanced detector pair, are preferred for transmitting the RF modulated optical signal. By adding a proper time delay 87 of one of the outputs and with a proper polarization rotated 88 as shown of this delayed optical signal, the two optical signals from the two output ports with orthogonal polarization can be combined with a polarization multiplexer 84 and sent to the photodetector 86. The two polarization light signals are converted to RF signals independently at the photodetector. With a proper setting of the differential delay (for example 10 ps for RF signals centered at 50 GHz), the previous complementary (out-of-phase) RF signals from the two ports are now in-phase at the photodetector 86, essentially doubling the RF output of the photodetector.

Figure 9:
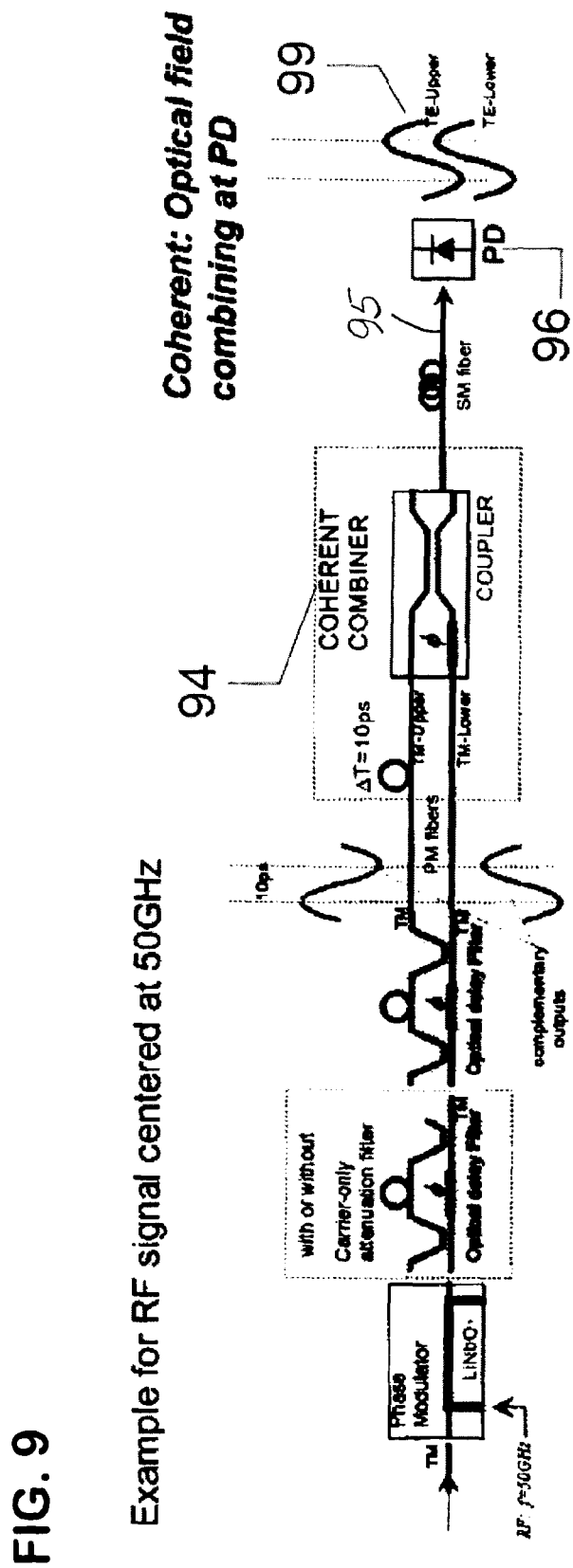
FIG. 9 schematically shows an example having additional optical delay-lines and a coherent combiner used to increase link gain of a phase modulator with a dual complementary-output filter using a single output fiber and a single photodetector.

FIG. 9 schematically shows additional optical delay-line and coherent combiner 94, used to increase link gain using single output fiber 95 and a single photodetector 96.

Alternatively, for fiber-optic transmission of a narrowband RF signal, an additional optical delay-line with proper delay time and a coherent optical combiner 94 with optical phase adjustment can be used to enhance the link gain, as shown schematically in FIG. 9. Both optical and microwave phases are tuned to align in-phase at the photodetector 96. The optical signals add coherently, leading to a larger increase in the RF signal output 99.

Figure 10:
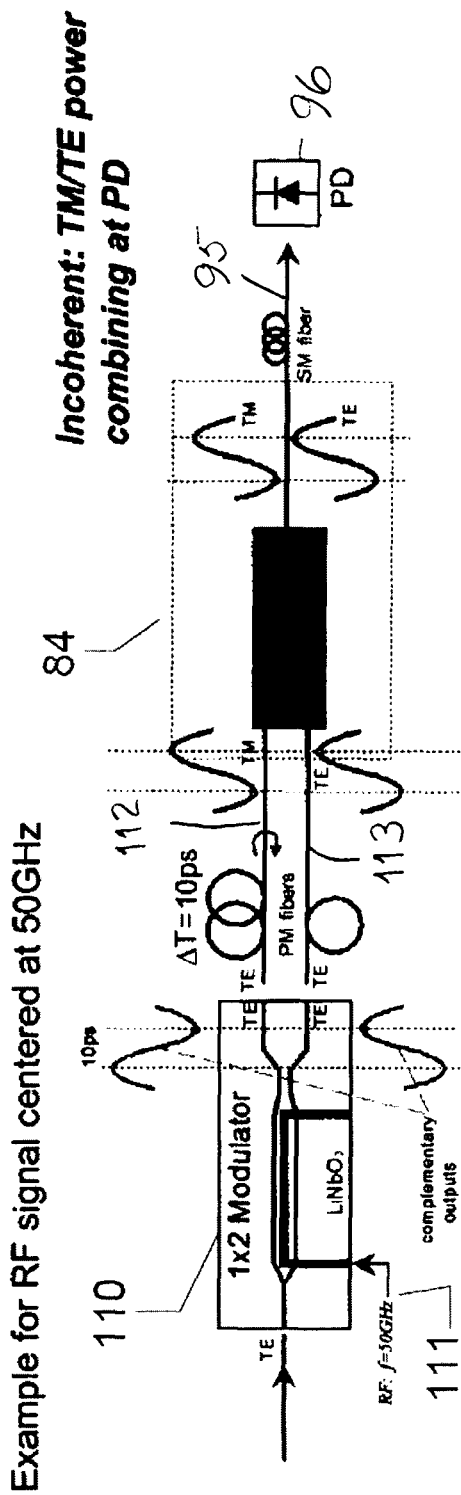
FIG. 10 schematically shows example additional optical delay-lines and an optical multiplexer used to increase link gain of a 1×2 dual-output Mach-Zehnder Intensity modulator using a single output fiber and a single photodetector.

FIGS. 9 and 10 schematically show a dual complementary modulator 110, additional optical delay-lines 112, 113 and optical multiplexer 84 or a coherent combiner coupler 94 that are used to increase link gain, using a single output fiber and a single photodetector.

Figure 11:
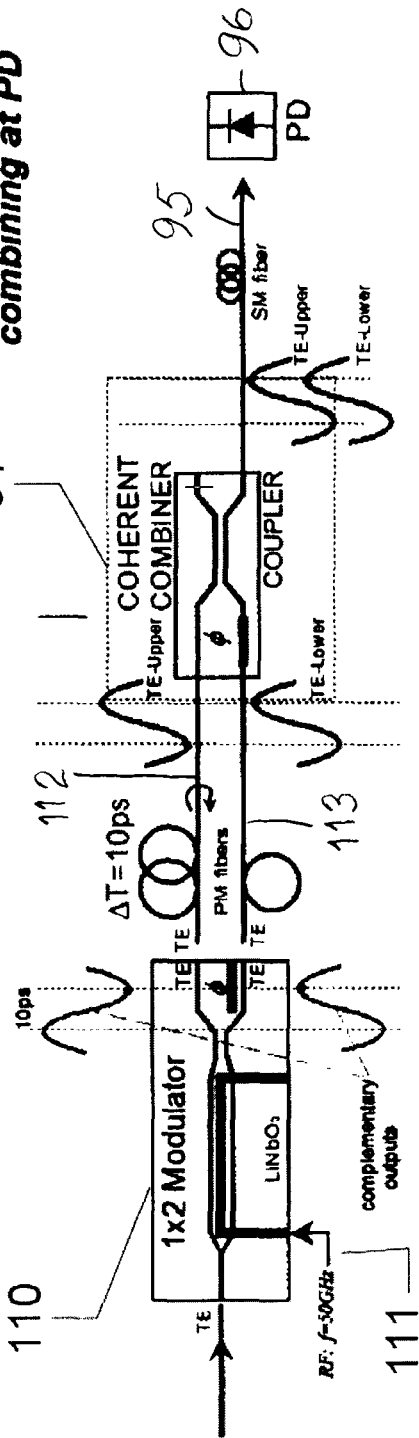
FIG. 11 schematically shows example additional optical delay-lines and a coherent combiner used to increase link gain of a 1×2 dual-output Mach-Zehnder Intensity modulator using a single output fiber and a single photodetector.

The use of these additional optical delay-lines 112, 113 and optical multiplexer as shown in FIG. 10 or a coherent combiner coupler 94 as shown in FIG. 11 to enhance RF fiber-optic link performance can also be applied to a standard intensity modulated link using a dual complementary-output modulator 110 as illustrated in FIGS. 10 and 11 for transmission of narrowband RF signals 111.

These implementations can be very useful to enhance the overall link gain, and etc. for an RF analog fiber-optic link for a narrowband, high RF-frequency signal.

While the invention has been described with reference to specific embodiments, modifications and variations of the invention may be constructed without departing from the scope of the invention, which is defined in the following claims.

I claim:

1. A method comprising:
providing an analog optical link,
providing an optical laser source,
providing an optical frequency spectrum power signal from the laser source,
providing an optical phase modulator,
providing the optical frequency spectrum power to the optical phase modulator,
providing a high frequency electric signal source,
providing a high frequency electric signal from the electric signal source to the optical phase modulator,
phase modulating the optical frequency spectrum power with the high frequency electric signal in the optical phase modulator,
providing a phase modulated optical signal with the frequency spectrum power and RF modulation sidebands from the optical phase modulator,
providing a filter combination having a first carrier attenuation filter and a second demodulation filter,
providing the phase modulated optical signal to the first carrier frequency attenuation filter,
attenuating a carrier frequency in the phase modulated optical signal,
providing the carrier-attenuated optical signal to the second demodulation filter,
demodulating the carrier-attenuated phase-modulated signal,
providing a photodetector,
providing the demodulated carrier-attenuated optical signal to the photodetector, and
changing the demodulated carrier-attenuated optical signal to an electric signal.

2. The method of claim 1, wherein the providing the filter combination comprises providing two reconfigurable optical filters.

3. The method of claim 1, wherein the providing the laser source comprises providing a high power laser source.

4. The method of claim 3, further comprising increasing optical power level from the high power laser source (by +10 dB, as an example) which results in increasing carrier and modulation side band signals by +10 dB correspondingly, and wherein the carrier-only attenuation filter attenuates the carrier power −10 dB without attenuating the +10 dB modulated sideband signal resulting in a 10 dB overall gain.

5. The method of claim 1, wherein the providing the filter combination comprises providing reconfigurable dual-stage optical delay line filters fabricated on low loss electro-optic substrate for performing the tunable/reconfigurable filtering functions.

6. The method of claim 1, further comprising feeding back the filtered out carrier signal back to the laser source and thereby enhancing optical power efficiency.

7. The method of claim 6, wherein the providing the laser source, the phase modulator and the feeding back comprises providing the laser modulator and the feeding back of the filtered out carrier signal in a laser cavity of the laser source.

8. The method of claim 1, wherein the providing of the filter combination comprises providing dual output delay line filters, providing a polarization multiplexer, combining outputs of the delay line filters into the photodetector and thereby enhancing RF link gain by synchronizing the RF phases of the two delay line outputs at the photodetector.

9. The method of claim 8, further comprising achieving higher signal gain using another optical delay line, and providing an optical coherent signal combiner with a time delay and coherently combining the optical and RF phase signals into the photodetector.

10. The method of claim 1, further comprising achieving higher signal gain using another optical delay line, and providing an optical coherent signal combiner with a time delay and coherently combining the optical and RF phase signals into the photodetector.

11. The method of claim 1, wherein the providing of the photodetector further comprises providing a balanced photodetector pair.

12. Apparatus comprising:
an analog optic link having:
a high power laser source,
a phase modulator connected to the laser source,
a radio-frequency signal source connected to the phase modulator,
an optical connector connected to the phase modulator,
a combination of filters connected to the optical center,
the combination of filters having:
a first carrier filter attenuating an optical signal, and
optical detectors connected to the phase demodulator filter for converting the demodulated optical signal to an electric signal.

13. The apparatus of claim 12, wherein the filtered out carrier signal is fed back to the laser source for enhancing optical power efficiency of the analog optic link.

14. The apparatus of claim 12, wherein the combination of filters comprises reconfigurable dual stage optical delay line filters.

15. The apparatus of claim 14, wherein the reconfigurable dual stage optical delay line filters are positioned on a low loss electro-optic $LiNbO_3$ substrate.

16. The apparatus of claim 14, further comprising another optical delay line filter and a polarization multiplexer combining outputs of the filters into the photodetector and thereby enhancing RF link gain by synchronizing RF signals of the two outputs at the photodetector.

17. The apparatus of claim 14, further comprising another optical delay line filter and an optical coherent signal combiner coherently combining optical and RF phases into the photodetector.

18. The apparatus of claim 17, further comprising an additional optical delay line and an optical multiplexer connected between the first filter and the photodetector.

19. Apparatus comprising:
two reconfigurable optical filters adapted to modify optical frequency profile of a phase modulated carrier optical power with modulation sideband signals, a first of the two optical filters adapted to receive the phase modulated carrier optical power with the modulation sideband signals and to attenuate mainly only the carrier optical power with a minimum effect on the modulation side band signals, and a second of the two optical filters adapted to demodulate the attenuated carrier optical power and the modulation side band signals to pass the demodulated signals to an optical detector.

20. The apparatus of claim 19, wherein:

the first of the two optical filters further comprises dual outputs, and wherein a first of the dual outputs is adapted to transmit the attenuated carrier optical power and the modulation side band signals to the second of the two optical filters, and a second of the dual outputs is adapted to transmit filtered-out carrier optical power to an optical power source.

21. The apparatus of claim 20, the optical power source further comprising:

a laser source, and a laser cavity connected to the laser source, and wherein the second of the dual outputs is connected to the laser cavity to transmit filtered-out carrier optical power to the laser cavity.

22. The apparatus of claim 21, wherein the two reconfigurable optical filters, the optical detector and the optical power source are closely positioned.

23. The apparatus of claim 22, further comprising:

a remote antenna having an RF output, a phase modulator connected to the remote antenna RF output and positioned near the antenna, a first long optical fiber connected to a carrier optical power output of the optical power source and connected to a carrier optical power input of the phase modulator, and a second long optical fiber connected to an output of the phase modulator and connected to an input of the two reconfigurable optical filters.

24. The apparatus of claim 20, further comprising:

a single optical detector, and a polarization multiplexer connected to the second of the two optical filters and to the single optical detector, the second of the two optical filters further comprises two output ports, and wherein a first of the two output ports is adapted to provide a first optical signal having a first polarization, and a second of the two output ports is connected to a time delay line for providing a delayed optical signal, and a polarization rotator connected to the time delay line and adapted for rotating polarity of the delayed optical signal and providing a second optical signal with a second polarization, wherein the second polarization of the second optical signal is orthogonal to the first polarization of the first optical signal, and wherein the first optical signal and the second optical signal are combined in the polarization multiplexer to a single multiplexer output connected to the single optical detector.

25. The apparatus of claim 24, wherein the first and second optical signals are converted to RF signals at the photodetector.

26. The apparatus of claim 19, further comprising:

a single optical detector, and a coherent combiner coupler connected to the second of the two optical filters and to the single optical detector, wherein the second of the two optical filters further comprises two output ports, and wherein a first of the two output ports is adapted to provide a first optical signal, and a second of the two output ports is connected to a time delay line, thereby providing a delayed optical signal, wherein the first optical signal and the second optical signal are combined in the coherent combiner coupler, and wherein the coherent combiner coupler has a single output connected to the single optical detector.

27. The apparatus of claim 26, wherein the first and second optical signals are converted to RF signals independently at the photodetector.

28. A method comprising:

providing an optical power source, providing a phase modular, receiving carrier optical power from the optical power source in the phase modulator, phase modulating the carrier optical power with RF signals, modifying optical frequency profile of a phase modulated carrier optical power with modulation sideband signals in the phase modulator, providing two reconfigurable optical filters, receiving the phase modulated carrier optical power with the modulation sideband signals in a first of the two reconfigurable optical filters, attenuating mainly only the carrier optical power with a minimum effect on the modulation side band signals in the first of the two optical filters, and passing the attenuated carrier optical power and the modulation side band signals a second of the two optical filters, demodulating the modulation side band signals in the second of the two optical filters, and passing the demodulated side band signals to an optical detector.

29. The method of claim 28, further comprising:

providing the first of the two optical filters with dual outputs, and transmitting the attenuated carrier optical power and the modulation side band signals from a first of the dual outputs to the second of the two optical filters, and transmitting filtered-out carrier optical power from a second of the dual outputs to the optical power source.

30. The method of claim 28, further comprising:

positioning the optical power source, the two reconfigurable optical filters and the photodetector close together, providing a remote antenna, positioning the phase modulator close to the remote antenna, providing the RF signal from the remote antenna to the phase modulator, providing a first long optical fiber, transmitting the carrier optical power from the optical power source through the first long optical fiber, providing a second long optical fiber, and transmitting the phase modulated optical power from the phase modulator through the long optical filter to the first of the two reconfigurable optical filters.

31. The method of claim 28, further comprising:

providing a polarization multiplexer having first and second inputs and a single output, and providing two output ports on the second of the reconfigurable optical filters, and wherein providing the photodetector comprises providing a single photodetector, providing a first optical signal in a first polarization from the first output port to the first input, providing a second optical signal from the second output port through a delay line and providing a delayed optical signal, rotating polarization of the delayed optical signal to a second polarization orthogonal to the first polarization, and providing the first and second optical signals to the polarization multiplexer, and providing a polarization multiplexed signal from the output of the polarization multiplexer to the single optical detector.

32. The method of claim 28, further comprising:

providing a coherent combiner coupler having first and second inputs and a single output, providing two output ports on the second of the reconfigurable optical filters, and wherein providing the photodetector comprises providing a single photodetector, providing a first optical signal from the first output port to the first input of the coherent combiner coupler, providing a second optical signal from the second output port through a delay line and to the second input of the coherent combiner coupler, providing the first optical signal and the delayed optical signal respectively to the first and second inputs of the coherent combiner coupler, combining the first and second optical signals in the coherent combiner coupler, and providing the combined signal from the output of the coherent combiner coupler to the single optical detector.

33. A method comprising:

modulating an optical energy with a RF input in a 1×2 dual-output intensity modulator providing an optical delay line connected to one of the dual outputs, delaying a first optical signal in the optical delay line, rotating polarization 90° of the first optical signal, combining the delayed and rotated first optical signal with a second optical signal from the other of the dual outputs with a polarization multiplexer having a single output, and providing the combined first and second optical signals to a photodetector.

34. A method comprising:

modulating an optical energy with a RF input in a 1×2 dual-output intensity modulator, providing an optical delay line connected to one of the dual outputs, delaying a first optical signal in the optical delay line, combining the delayed first optical signal with a second optical signal from the other of the dual outputs with a coherent combiner having a single output, and providing the combined signals to a photodetector.

* * * * *